W. F. J. CASEY & G. CAVIN.
TRUCK CENTERING DEVICE.
APPLICATION FILED SEPT. 25, 1917.
1,283,074.
Patented Oct. 29, 1918.
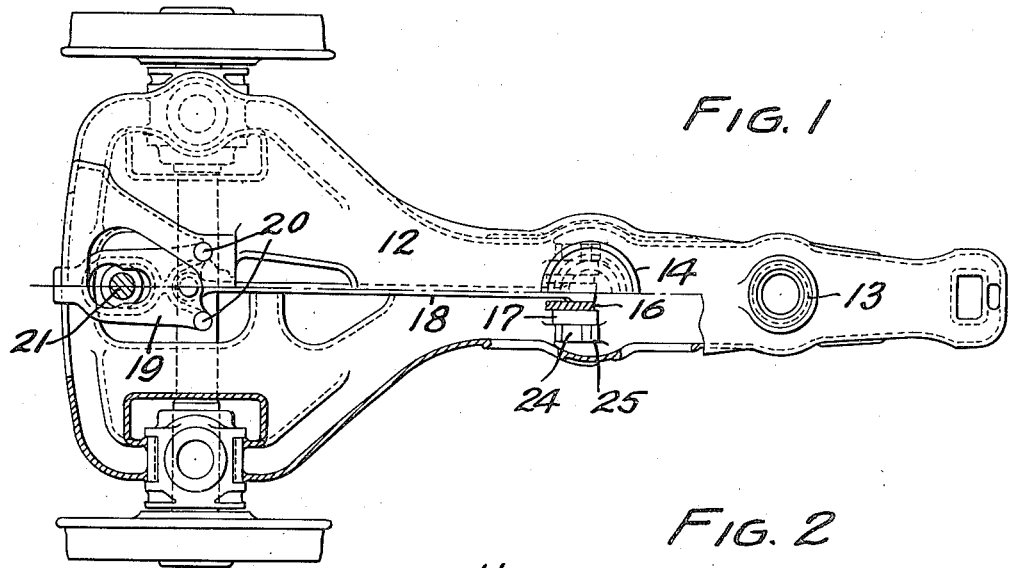
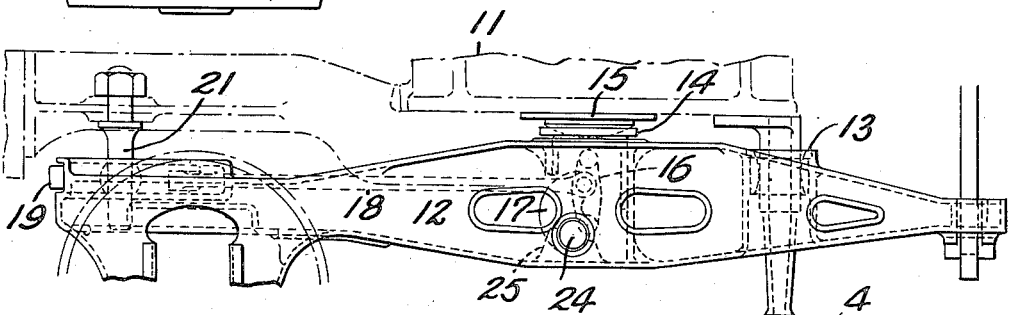
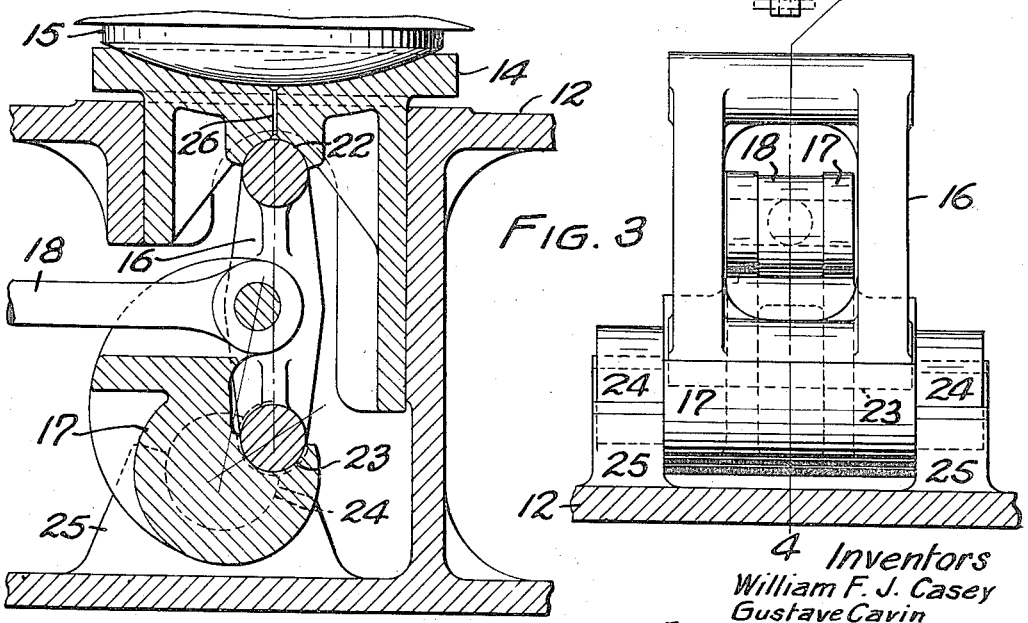
Inventors
William F. J. Casey
Gustave Cavin

UNITED STATES PATENT OFFICE.

WILLIAM F. J. CASEY AND GUSTAVE CAVIN, OF KINGSTON, ONTARIO, CANADA.

TRUCK-CENTERING DEVICE.

1,283,074.

Specification of Letters Patent. Patented Oct. 29, 1918.

Application filed September 25, 1917. Serial No. 193,116.

*To all whom it may concern:*

Be it known that we, WILLIAM F. J. CASEY and GUSTAVE CAVIN, both subjects of the King of Great Britain, and residents of the city of Kingston, in the Province of Ontario and Dominion of Canada, have invented certain new and useful Improvements in Truck-Centering Devices, of which the following is a full, clear, and exact description.

This invention relates to improvements in centering devices for trucks such as used under railway locomotives and cars or other apparatus, and resides broadly in the application of the weight supported by the truck to urge the truck to a predetermined position.

The object of the invention is to provide simple, effective and durable gravity actuated means for centering a truck with relation to the body supported by it.

A further object is to provide a centering device which is actuated purely by the force of gravity, thus eliminating springs.

The invention consists briefly in providing a floating load bearing between the truck and the body supported thereby, which is sustained by a toggle lever operatively connected to an oscillating lever mounted for example in the truck and engaging a rigid member carried by the body. The invention forms in part an improvement on our former Patent No. 1,233,979, granted July 17th, 1917. It will be seen that this former patent discloses the use of an oscillating lever urged to a normal position by springs. According to the present invention, the springs are replaced by the floating load bearing and connection. It will be understood that any of the types of oscillating lever shown in the patent as well as many other types may be used, and also that the centering device may be mounted in the body carried by the truck equally well as in the truck. It will further be understood that while the invention has been shown as applied to a particular type of locomotive pilot truck, it is in no way limited to this application, as it may be applied equally well to trailing trucks or trucks of any other type; the showing in the drawings of this application and the description thereof being purely explanatory.

In the drawings which illustrate the invention:—

Figure 1 is a plan view of a truck partly in section showing the centering device in position therein.

Fig. 2 is a side elevation of the truck showing a fragment of the body supported thereby.

Fig. 3 is a rear elevation of the toggle lever.

Fig. 4 is a section of the toggle lever and load bearing on the line 4—4, Fig. 3.

Referring more particularly to the drawings, 11 designates a vehicle and 12 a truck frame. In the particular type of truck shown, the pivotal bearing 13, around which the truck oscillates in a lateral direction, and the load bearing 14, around which the truck oscillates in a vertical direction, are separate and eccentric, but it will be understood that this need not be the case. The load bearing 14 is vertically slidable in the truck frame, as clearly shown in Fig. 4, and has a spherically curved upper surface with which a similarly curved complementary bearing member 15 floating under the vehicle 11 engages. The bearing member 14 is supported by a link 16 arranged in compression between the bearing and the short arm of what is virtually a bell crank lever 17 journaled in the truck frame. The other arm of the bell crank lever is connected by a link 18 with a laterally oscillating lever 19 having alternative points of pivotal support 20 in the truck frame. As will be clearly seen, the link 18 connects with the lever 19 intermediate its points of support, so that tension in the link will normally hold the lever with both of its pivots in engagement with the truck. This lever is of exactly the same construction as described in our former patent, and therefore does not require elaboration. The lever is pivotally and slidably engaged by a pin 21 carried by the vehicle 11. In the particular form of bearing support shown in Figs. 3 and 4, the link 16 bears at one end in a recess 22 in the under side of the load bearing 14 and at the opposite end in a recess 23 in the short arm of the lever 17. This link has a central aperture shown clearly in Fig. 3, into which the extremity of the long arm of the lever 17 and the link 18 project, but it will be understood that the invention is not limited to this exact construction. The lever 17 is mounted by means of strong trunnions 24 in bearings 25 of the truck frame. This particular construction has been adopted as it permits the oscillating lever 19 to exert great lifting power on the floating bearing 14, in order to deal with the great weights met with in locomotive construction. It will be seen that while the members 16 and 17 have been referred to as a link and a bell crank lever, that in their particular association and location, they form a toggle mechanism. In cases where the weight to be dealt with is much less, a simple toggle lever to which the link 17 is connected may be used. It will also be understood that where greater weights are dealt with, a cam or other arrangement may be substituted for the mechanism shown. A lubricating channel 26 is provided between the face of the bearing 14 and the link recess 22.

The operation of the device is extremely simple and will be readily understood from the drawings. When the truck swings laterally under the vehicle, the engagement of the vehicle carried pin 21 in the oscillating lever 19 causes the lever to oscillate around one of its pivots 20, so that longitudinal movement of the link 18 is produced. This causes oscillation of the lever 17, the short arm of which thrusts the link 16 upwardly, lifting the floating bearing 14 together with the whole load sustained by the bearing. In the case of a locomotive, it is altogether probable that the upward movement of the bearing will be little or nothing, but that the truck frame will be forced downwardly. If, as is now usually the case, the truck is connected with the spring suspension system of the locomotive, this downward thrust will be taken up by yield of the locomotive springs. In any event, there will be relative vertical movement between the truck frame and the bearing 14, which will be resisted by the load on the bearing. It is obvious that when the force which produces lateral oscillation of the truck is removed, the whole weight sustained by the truck will operate through the mechanism to return the oscillating lever 19 to a state of equilibrium resting on both of its pivots. This movement of the oscillating lever forces the truck to a central position under the vehicle by reason of the lever's engagement with the pin 21. It will be understood that as the oscillation of the lever 19 is very little, the actual movement of the load bearing 14 will be still less, owing to the interposition of the bell crank lever. In fact, this movement is so slight that the angular relation of the lever 17 and link 16 will not change sufficiently to vary the effect of the load, as would obviously be the case if the movement was considerable. Therefore, the load as applied to the oscillating lever may be considered as constant for all positions of the lever, so that the only variation in the resistance when the truck moves laterally from the central position is that due to the change in angular relation between the oscillating lever and the link 18. The movement of the oscillating lever is at no time very great, so that the change of angular relation does not affect the ratio or movement of the parts. Therefore, the load is a constant factor of resistance at all degrees of truck oscillation, which will occur in practice. If there is any variation of the truck centering effect of the load, it is in the nature of an increase of effect, as the oscillation increases due to the fact that the change of angular relation between the oscillating lever and link 18 is more rapid than the change of relation between the lever 17 and link 16.

Vertical oscillation of the truck in every direction is permitted by the spherical surfaces of the load bearing, and by reason of the sliding and pivotal engagement of the pin 21 in the oscillating lever, as fully described in our former patent, has no effect on the centering mechanism.

The parts of the centering mechanism are few in number, simple in design, inexpensive and durable in construction, and efficient in operation.

From the foregoing description, it will be obvious that exactly the same result will be produced if the arrangement is reversed, that is to say, if the pin 21 is carried by the truck and the lever and link mechanism by the vehicle, and the bearing member 15, made to float instead of the member 14. It will also be apparent that any of the forms of oscillating lever shown in the patent, as well as other forms which may be designed to meet particular and at present uncontemplatable conditions, may be used. While the invention has been described purely in its application to trucks, it will be obvious that it may be applied to other uses.

Having thus described our invention, what we claim is:—

1. In a centering device, the combination with relatively movable members of a load bearing between the members, and sustaining mechanism for said load bearing including an oscillatable lever in one of the members having engagement with the other member.

2. In a device of the class described, the combination with a pair of relatively movable members of a lever in one of the members having engagement with the other member, and means actuated by the load of one member on the other constantly urging said lever to a position in equilibrium.

3. In a device of the class described, the combination with a pair of relatively revoluble members of a lever in one of said members oscillatable about either of two pivots and having connection with the other member, and mechanism actuated by the load of one member on the other connected to said lever intermediate its pivots.

4. In a device of the class described, the combination with a pair of relatively revoluble members of a centering lever carried in one of the members having engagement with the other member, and mechanism actuated by the load of one member on the other urging said centering lever to its central position.

5. In a device of the class described, the combination with a truck and a vehicle supported thereby, of a centering lever in one of them having engagement with the other operative to oscillate the lever relatively to the member carrying it upon the relative oscillation of the truck and vehicle, a load bearing between the truck and vehicle, and connection between said load bearing and the oscillating lever tending to hold the lever against oscillation.

6. In a device of the class described, the combination with a truck and a vehicle supported thereby, of a centering lever mounted in one of said parts and having engagement with the other part whereby relative oscillation of the parts will produce oscillation of the lever in the part carrying it, a pair of pivots about either of which said lever may oscillate, a load bearing between the truck and vehicle, and sustaining means for said load bearing connected to the oscillating lever intermediate its pivots.

7. In a device of the class described, the combination with a truck, a vehicle supported thereby, of a lever oscillatably mounted in one of said parts having connection with the other part, adapted to produce oscillation of the lever upon the relative revolution of the truck and vehicle, a load bearing between the truck and vehicle, a toggle mechanism sustaining the load bearing, and connection between said toggle mechanism and the oscillating lever whereby the load of the vehicle on the truck urges the lever to its central position.

8. In a device of the class described, the combination with a truck and vehicle supported thereby, of a centering lever in one of said parts having engagement with the other part, a load bearing vertically slidable in one of the parts, a bell crank lever, a link connected between one of the arms of the bell crank lever and the load bearing, and a link connected between the other arm of said bell crank lever and the oscillating lever.

9. In vehicle construction, the combination with a truck and a vehicle body, a load bearing supporting the body on the truck, means for centering the truck under the vehicle body and an operative connection between the load bearing and the centering device.

10. In vehicle construction, the combination with a truck and a vehicle body, a load bearing supporting the body on the truck, means for centering the truck under the vehicle body and an operative lever having a connection with the load bearing and the centering device.

In witness whereof, we have hereunto set our hands.

WILLIAM F. J. CASEY.
GUSTAVE CAVIN.

Witnesses:
GEORGE W. LOLY,
R. R. DERRY.